United States Patent
Reed et al.

(10) Patent No.: US 9,897,762 B2
(45) Date of Patent: Feb. 20, 2018

(54) MULTIPLE ENVIRONMENT FIBER OPTIC CABLE

(71) Applicant: Fiberoptic Components, LLC, Sterling, MA (US)

(72) Inventors: Eric Reed, Suwanee, GA (US); Kevin Beaton, Gardner, MA (US)

(73) Assignee: Fiberoptic Components, LLC, Sterling, MA (US)

( * ) Notice: Subject to any disclaimer, the term of this patent is extended or adjusted under 35 U.S.C. 154(b) by 0 days.

(21) Appl. No.: 15/211,698

(22) Filed: Jul. 15, 2016

(65) Prior Publication Data

US 2017/0017045 A1     Jan. 19, 2017

Related U.S. Application Data

(60) Provisional application No. 62/192,738, filed on Jul. 15, 2015.

(51) Int. Cl.
    *G02B 6/38*     (2006.01)
    *G02B 6/40*     (2006.01)

(52) U.S. Cl.
    CPC .......... *G02B 6/3816* (2013.01); *G02B 6/403* (2013.01)

(58) Field of Classification Search
    USPC ..................................... 385/59, 78
    See application file for complete search history.

(56) References Cited

U.S. PATENT DOCUMENTS

| | | | | |
|---|---|---|---|---|
| 4,325,606 A | * | 4/1982 | Lkuno; Yuji ....... | A61B 1/00124 385/117 |
| 4,997,247 A | * | 3/1991 | Stowe ................ | G02B 6/2856 385/28 |
| 5,469,522 A | | 11/1995 | Fan | |
| 5,717,806 A | | 2/1998 | Pileski et al. | |
| 8,757,892 B1 | * | 6/2014 | Allen .................. | G02B 6/3816 385/59 |
| 2002/0126970 A1 | * | 9/2002 | Anderson ........... | G02B 6/4433 385/113 |
| 2004/0202401 A1 | * | 10/2004 | Berg ................... | G01V 11/00 385/12 |
| 2006/0193575 A1 | * | 8/2006 | Greenwood ........ | G02B 6/4495 385/109 |

OTHER PUBLICATIONS

International Search Report and Written Opinion by the International Searching Authority for International Patent Application No. PCT/US16/42547 dated Oct. 4, 2016.

* cited by examiner

*Primary Examiner* — Eric Wong
(74) *Attorney, Agent, or Firm* — McCarter & English, LLP; David R. Burns

(57) ABSTRACT

A fiber optic cable is presented having a pressure fitting at an end of the cable. The pressure fitting can create a pressure and/or chemical seal to prevent migration of environmental elements into or out of the cable. The fiber optic cable can advantageously be configured for use in varied environments including, for example, one or more of caustic, high-pressure, or low-pressure environments.

21 Claims, 5 Drawing Sheets

MULTIPLE ENVIRONMENT FIBER OPTIC CABLE

RELATED APPLICATION

This application claims priority to U.S. Provisional Patent Application 62/192,738 filed Jul. 15, 2015, the entire contents of which is incorporated herein by reference.

BACKGROUND

Fiber optic cables are used in a variety of commercial applications and in medical devices. Frequently, a fiber optic cable will contain a bundle of optic fibers surrounded by a cable jacket. The bundled optic fibers conduct light from one end of the fiber optic cable to the other end. Some fiber optic applications require that the fiber optic cable be bare or connectorized in a specific way to couple to other equipment. During use, fiber optic cables are often subjected to caustic, high-pressure, or low-pressure (vacuum) environments.

BRIEF SUMMARY

Embodiments of the present invention provide a fiber optic cable and a method for its assembly. The fiber optic cable may include a pressure fitting that creates a pressure and/or chemical seal to prevent migration of environmental elements into or out of the bundle of optic fibers in the cable. The fiber optic cable can be advantageously configured for use in varied environments including, for example, one or more of caustic, high-pressure, or low-pressure environments. Further, randomization of the optic fibers within the fiber optic cable improves the quality and uniformity of the light output from the fiber optic cable.

In one embodiment, a fiber optic cable includes multiple optic fibers extending between a first end of the fiber optic cable and a second end of the fiber optic cable. The fiber optic cable also includes a pressure fitting that defines an internal through-hole. The pressure fitting includes a pressure ferrule, a first pressure plug, and a second pressure plug. The first pressure plug is disposed within the pressure ferrule on a first side of the pressure fitting and the second pressure plug is disposed within the pressure ferrule on a second side of the pressure fitting. A portion of each of the optic fibers at the first end of the fiber optic cable extends through the internal through-hole of the pressure fitting and the pressure fitting is retained at the first end of the fiber optic cable. The pressure fitting creates at least one of a pressure or chemical barrier at the first end of the fiber optic cable that prevents migration of fluids into or out of the fiber optic cable. The optic fibers are configured in a randomizing arrangement within the internal through-hole of the pressure fitting to randomize the optic fibers in the second end of the fiber optic cable.

In another embodiment, a method of producing a fiber optic cable includes providing a fiber optic cable that includes multiple optic fibers extending between a first end and a second end of the fiber optic cable. The method also includes configuring the optic fibers at the first end of the fiber optic cable in a randomizing arrangement. In addition, the method includes passing the first end of the fiber optic cable through an internal through-bore of a first pressure plug. The method further includes coating each of the randomized optic fibers with a first quantity of a binder material. Additionally, the method includes passing the first end of the fiber optic cable and the coated randomized optic fibers through an internal through-bore of a pressure ferrule and inserting the first pressure plug into a first counterbore of the pressure ferrule. The method also includes passing the first end of the fiber optic cable through an internal through-bore of a second pressure plug. The method includes inserting the second pressure plug into a second counterbore of the pressure ferrule. Moreover, the method includes inserting a bushing into the second counterbore of the pressure ferrule. The method also includes applying a second quantity of a binder material to the optic fibers at a through-hole of the bushing and applying the second quantity of a binder material to fill the second counterbore of the pressure ferrule.

Additional features, functions and benefits of the disclosed systems will be apparent from the description which follows, particularly when read in conjunction with the appended figures.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
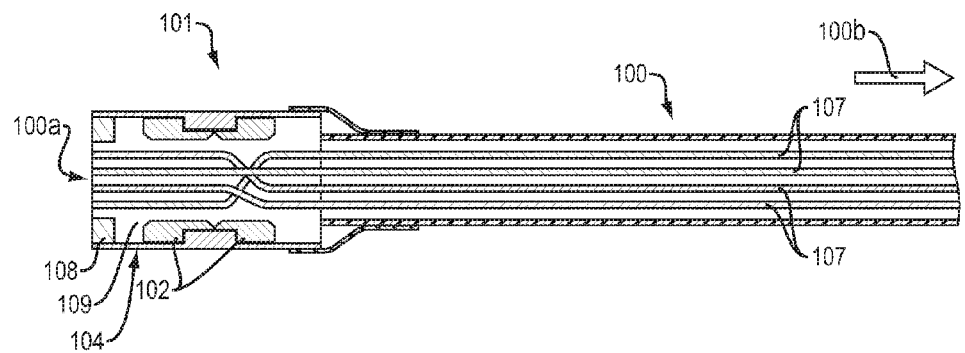
FIG. 1A illustrates a longitudinal cross-sectional view of a fiber optic cable, in accordance with various embodiments.

Embodiments of the present invention provide a fiber optic cable suitable for use in a variety of different product applications. Fiber optic cables are often subjected to caustic, high-pressure, or low-pressure (vacuum) environments. In such an environment, isolation of internal or other functional components of the cable is desirable to prevent damage to the cable components, currently or subsequently connected electrical components or instruments, or the end user. Further, some fiber optic applications require that the fiber optic cable be bare or connectorized in a specific way to couple to other equipment. Such a bare or application-constrained connection may not be able to prevent penetration of fluids into the cable in hostile environments, which can cause damage to the cable itself or to components connected to the cable. Similarly, many connection types, including bare cable, are inappropriate in a low-pressure environment because the cable components cannot appropriately seal the entry point, which can limit the vacuum level that is ultimately achievable.

For example, some applications of fiber optic cables involve an isolated chamber (e.g., a high-pressure chamber, vacuum chamber, or caustic chamber) where sensitive equipment or human operators cannot safely enter. The fiber optic cable must be constructed in a manner that allows the cable to withstand or operate within the isolated chamber. In some instances, the fiber optic cable must be constructed in a manner that allows the cable to be installed via a pass-through that allows a partial length of the cable to be inside the isolated chamber and the remaining length to be outside the isolated chamber without affecting the environment within the isolated chamber. Accordingly, where the isolated chamber is a vacuum chamber, it is desirable to seal the cable sufficiently to allow the chamber to achieve the required pressure or vacuum. Similarly, where the isolated chamber contains a caustic environment, it is desirable to seal the cable to provide sealing and chemical resistance to prevent ingress of the caustic materials into the cable and subsequent migration over the length of the cable, potentially damaging or degrading the cable or leading ultimately to contact with sensitive instrumentation, resulting in damage or alteration of performance. Examples of caustic environments where a fiber optic cable may be present include environments containing corrosive fluids or gases such as strong acids or bases.

In a similar vein, various applications of fiber optic cables require that the cable be sterilized between uses in a variety of ways or cleaned with corrosive or caustic chemicals. For example, medical endoscopes utilizing a fiber optic cable must be thoroughly sanitized to prevent the spread of disease between patients. It will be apparent in view of this disclosure, that fiber optic cables used in other medical, veterinary, biological, or industrial applications may also require sterilization or cleaning such as, for example, applications involving robotic surgery, diagnostics, therapeutics, neurosurgery, dentistry, pharmaceutical or other chemical manufacturing, or any other suitable application. Examples of sterilization processes and chemicals that may be used with fiber optic cables include, but are not limited to, ethylene oxide, vaporized hydrogen peroxide, gas-phase plasma hydrogen peroxide, steam autoclave, and Sterrad® (Advanced Sterilization Products, Irvine Calif.). The sterilization or cleaning process is often performed under extreme pressure or temperature conditions where it is likely that chemicals or steam will infiltrate the cable and weaken or compromise the components within. This is especially dangerous in medical applications because bacteria can then penetrate these ingress points and potentially survive subsequent cleanings.

Embodiments of the present invention provide chemical and/or pressure-resistant fiber optic cables and methods for their assembly. The cables are characterized in accordance with various embodiments by a pressure fitting that prevents infiltration, migration, or exfiltration of environmental elements between the proximal and distal ends of the cable. The pressure fitting can achieve environmental isolation of the cable by forming a tight seal among multiple non-reactive fitting parts using a binder material. Application of the binder material at multiple points within the pressure fitting can help to prevent the passage of air or fluid molecules through the pressure fitting to prevent migration of dangerous chemicals and/or destruction of vacuum.

Randomization of optic fibers within a fiber optic cable can improve the quality and uniformity of the light output from the cable. However, some optic fibers are initially commercially provided in a pre-jacketed fiber optic cable that makes such randomization difficult. For example, applications may require that the cable jacket be stripped in order to provide a pressure fitting at one end. In such a case where the pre-jacketed cable is being stripped at one end, the option to randomize is only available at the stripped end of the fiber optic cable because of the presence of the jacket covering the rest of the cable. Conventionally in this scenario providing a pressure- and/or chemical-resistant seal at an end of the cable while also producing randomization has proven difficult and time consuming because randomization tends to thwart coating and prevent proper sealing as the act of tangling or otherwise randomizing the optic fibers interrupts the flow of the epoxy or other binding material along each fiber. Embodiments of the present invention as described herein have overcome the problem of providing a pressure- and chemical-resistant seal while also randomizing fiber location within a pressure fitting located at the stripped end of a fiber optic cable.

Figure 1B:
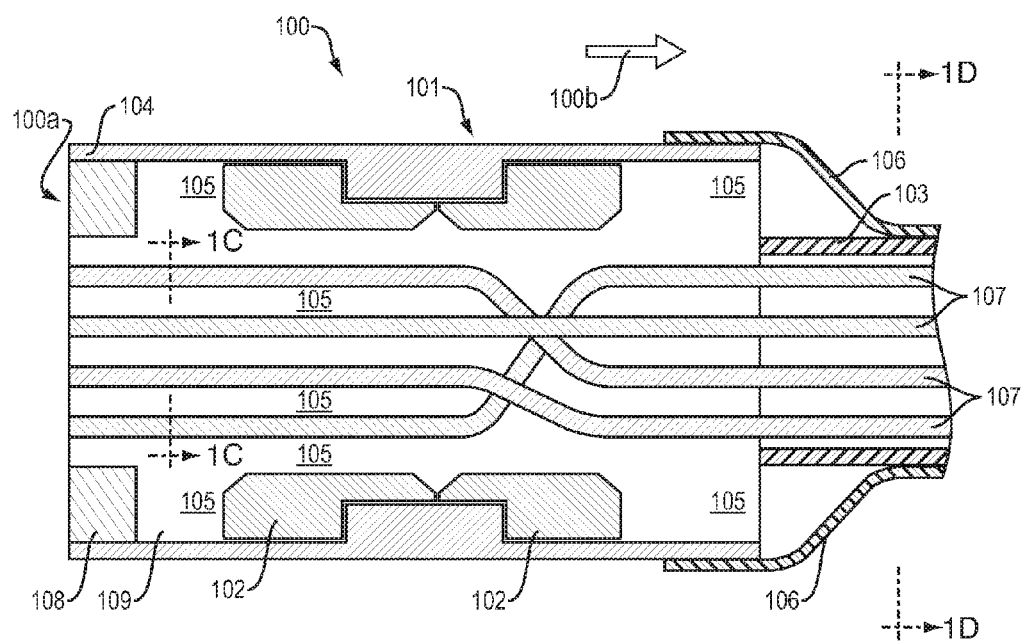
FIG. 1B illustrates a longitudinal cross-sectional view of a fiber optic cable showing an exemplary pressure fitting, in accordance with various embodiments.
Figure 1C:
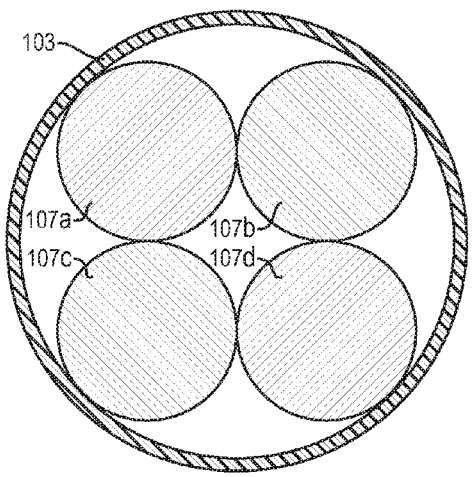
FIGS. 1C and 1D illustrate transverse cross-sectional views of the fiber optic cable in FIG. 1A taken at lines C-C' and D-D', respectively.
Figure 1D:
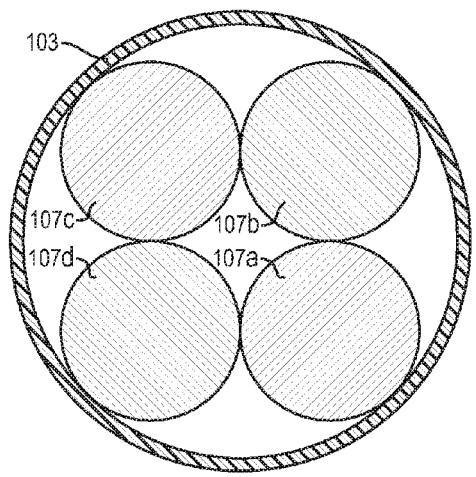
Figure 2A:
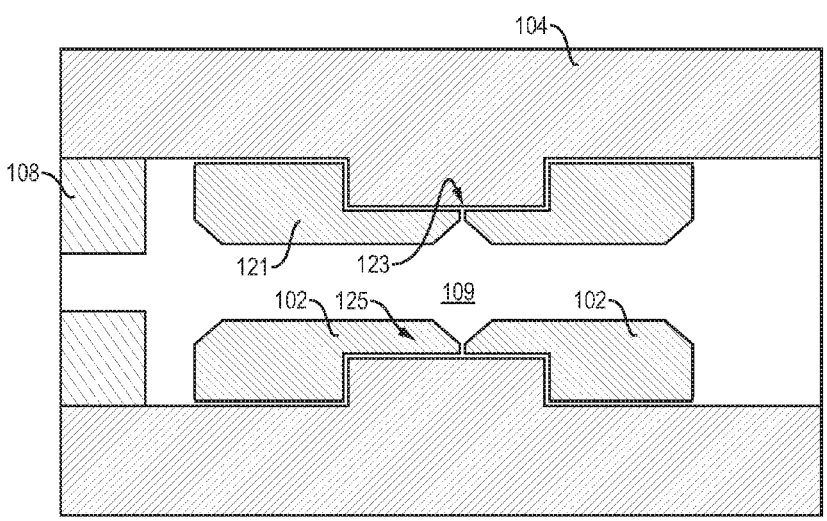
FIG. 2A illustrates a cross-sectional view of an assembled pressure fitting according to various embodiments.
Figure 2B:
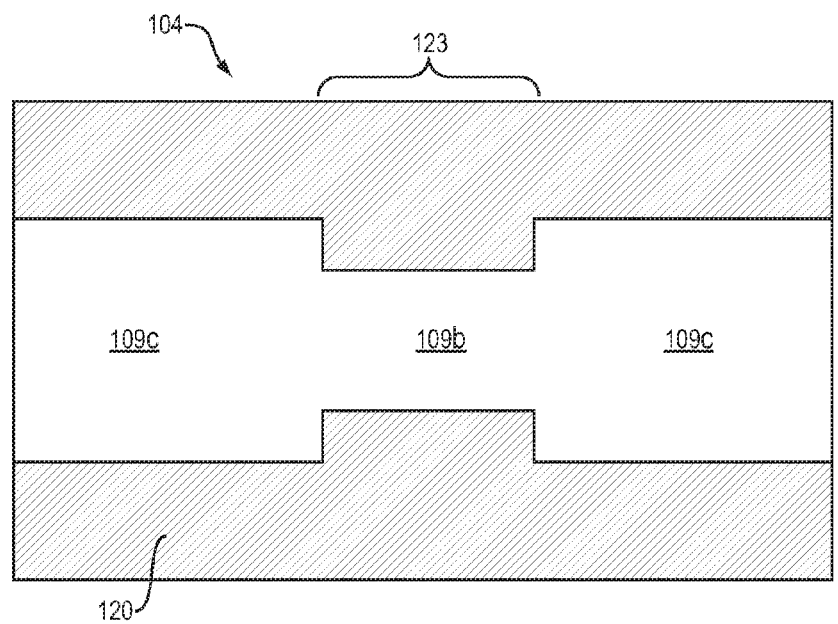
FIGS. 2B, 2C, and 2D illustrate cross-sectional views of components of a pressure fitting according to various embodiments.
Figures 2C, 2D:
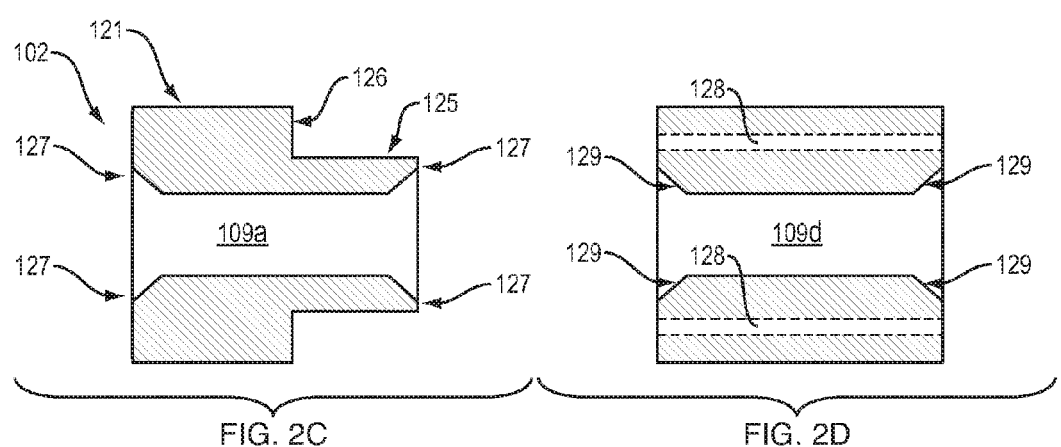

FIG. 1A illustrates a longitudinal cross-sectional view of a fiber optic cable, in accordance with various embodiments. FIG. 1B illustrates a longitudinal cross-sectional view of the fiber optic cable of FIG. 1A showing an exemplary pressure fitting, while FIGS. 1C and 1D illustrate transverse cross-sectional views of the fiber optic cable in FIG. 1B taken at lines C-C' and D-D'. Referring now to FIGS. 1A, 1B, 1C, and 1D, a fiber optic cable 100 includes a bundle of multiple optic fibers 107 extending between a first end 100a and a second end 100b of the cable 100 wherein the optic fibers 107 extend through an internal through-hole 109 of a pressure fitting 101. The pressure fitting 101 may include a pressure ferrule 104, a bushing 108, and one or more pressure plugs 102 (e.g., two as shown). Portions of the cable 100 extending from the pressure fitting 101 toward the second end 100b may be contained within a cable jacket 103. The pressure fitting 101 can be retained at the first end 100a of the cable.

As shown in FIGS. 1B-1D, the relative, cross-sectional, spatial positioning of each of the optic fibers 107 (e.g., B-B', C-C') of the cable 100 can be randomized within the pressure fitting 101. As explained further below, the randomization may improve the quality and uniformity of the light output from the fiber optic cable. Randomization is shown, for example, in FIGS. 1C-1D, which are transverse cross-sections of the fiber optic cable 100 taken near the first end 100a at B-B' and the second end 100b at C-C', respectively. As shown in FIGS. 1C-1D, the relative spatial positions of the individual optic fibers 107a-107d have been mixed relative to one another in a random manner. Further, in various embodiments as depicted in FIG. 1B, the interstitial space between and among the bundle of optic fibers 107 in the through-hole 109 of the pressure fitting 101 can, for example, be filled with a binder material 105, to retain the pressure fitting 101 at the first end 100a of the cable 100 and advantageously establish a pressure and/or chemical migration barrier between the first end 100a and the second end 100b.

Although FIGS. 1B-1D, for clarity, depict only four optic fibers 107a-d, it will be apparent in view of the present disclosure that any number of optic fibers 107 can be used in accordance with various embodiments and that the number of optic fibers 107 can vary depending on application-specific requirements. Similarly, although FIG. 1B, for clarity, depicts a pressure fitting 101 only at a first end 100a of the cable 100, it should be appreciated that, in accordance with various embodiments, the cable 100 may comprise one or more pressure fittings 101 at one or more of its ends depending on application-specific requirements.

As noted above, portions of the cable 100 may be contained within a cable jacket 103. Cable jacket 103 may be made of any suitable material. A non-exhaustive list of cable jacket 103 materials can include, for example, polyvinylchloride (PVC) in various forms, fluoropolymer plenum, polyolefin, polyethylene, polyurethane, polybutylene terephthalate, polyamide, LSFH polymer, any other suitable material whether flexible or rigid, and combinations thereof. In accordance with various embodiments, the cable jacket 103 may extend all the way to the second end 100b of the cable 100 or the second end of the cable may be bare, unjacketed, or connectorized as appropriate for the desired application. In one embodiment, the cable jacket 103 may be stripped back from the first end 100a of the cable 100 to expose the optic fibers 107. In an alternate embodiment, unjacketed optic fibers 107 may be fed through the cable jacket 103. In accordance with various embodiments, an outer cable diameter of the cable 100 including the cable jacket 103 can be greater than, equal to, or less than an inner counterbore diameter of the counterbore 109c of the pressure ferrule 104. To provide an additional seal between the pressure ferrule 104 and the jacket 103, a sealing member 106 may be used in various embodiments. The sealing member 106 may be made of a variety of materials including, but not limited to, heat-shrink tubing, cloth or plastic adhesive tapes, elastomeric materials, and any other suitable material or combination of materials that meets application-specific requirements.

As noted above, in some embodiments binder material 105 may create a pressure or chemical barrier between the bundle of optic fibers 107 that prevents the migration of fluids into the optical bundle and the fluid's passage between the first and second ends of the cable. In accordance with various embodiments, the binder material 105 can include, for example, a heat-cure epoxy such as EPO-TEK® 377 or 353ND (Epoxy Technology Inc.) and/or any other suitable binder material satisfying application-specific pressure and/or chemical resistance properties. In accordance with various embodiments, the binder material 105 can be self-curing, can include multiple interacting components (e.g., a two-part epoxy), or may require an external input to cure including, for example, heat or ultraviolet radiation. In some embodiments, the binder material 105 may be a resin, a thermoset polymer, or a non-epoxy glue or adhesive. In an exemplary embodiment, the outer diameter of each fiber in the optic fibers 107 can be completely coated by the binder material 105 within the pressure fitting 101. In a preferred embodiment, the pressure fitting 101 can generate a hermetic seal of at least $1 \times 10^{-8}$ cc/sec @ 1.0 atm.

The optic fibers 107 may include fibers having any properties necessary to meet the needs or requirements of an application. For example, each of the optic fibers may be bare or include cladding or jacketing. In accordance with various embodiments, the optic fibers 107 may include fibers having different diameters, different material properties, or different intended uses. For example, the cable 100 may include a single large-diameter fiber that can transmit light from a second end 100b to a first end 100a and several small-diameter fibers that can transmit light or signals from a first end 100a to a second end 100b. In accordance with various embodiments, the optic fibers may include single-mode or multi-mode fibers, and the fibers may be made of any suitable material including various glasses, plastics, and composite materials. In accordance with various embodiments, the optic fibers 107 can include fibers characterized by a single index of refraction, stepwise radial changes in index of refraction, or a radial gradient index of refraction (GRIN).

In one embodiment, the spatial location of each of the optic fibers 107 may be randomized within the cable 100 between the first end 100a and the second end 100b. Such spatial randomization can improve the quality and uniformity of the light output from the fiber optic cable 100 that would otherwise be poor due to factors such as a non-uniform illumination source or poor coupling into the cable. In FIG. 1B, an example of location randomization is depicted within the pressure fitting 101 as the locations of the optic fibers 107 become mixed and interchanged. FIG. 1C represents a cross-section of FIG. 1B at the location C-C' and depicts a particular spatial arrangement of the optic fibers 107A, 107B, 107C, 107D at a first end 100a of the fiber optic cable 100. FIG. 1D represents a cross-section of FIG. 1B at the location C-C' and depicts the same optic fibers 107A, 107B, 107C, 107D within a cable jacket 103 at a second end 100b of the fiber optic cable 100. Due to randomization of the optic fibers 107 within the pressure fitting 101, the arrangement of fibers 107A, 107B, 107C, 107D within the cable jacket 103 at the second end 100b can be different than at the first end 100a. In an exemplary embodiment, randomization of the fibers' spatial arrangement can occur within the pressure fitting 101. This randomization can be accomplished through braiding, weaving, or tangling of the optic fibers 107 within the pressure fitting 101.

In accordance with various embodiments, the first end 100a of the cable 100 may terminate within the pressure fitting 101, may be flush with the end face of the pressure fitting 101, or may extend past the end face of the pressure fitting 101 for integration with a connector or other terminal attachment. In embodiments where the first end 100a of the cable 100 is flush with the end face of the pressure fitting 101, the fiber ends may be polished to produce a flat surface.

Referring now to FIGS. 2A, 2B, 2C, and 2D the components of the pressure fitting 101, when assembled can, in accordance with various embodiments, include a pressure ferrule 104, a bushing 108, and one or more pressure plugs 102 that, together, define an internal through-hole 109. In accordance with various embodiments, each pressure plug 102 can be provided with an internal plug through-bore 109a which, in cooperation with the opposing counterbores 109c of the pressure ferrule 104 and the through-hole 109d of a bushing 108, defines the internal through-hole 109 of the pressure fitting 101. In one embodiment, an outer body diameter of a body 121 of each pressure plug 102 can be configured to ensure that there is an appropriate fit between the outer body diameter of the body 121 of the pressure plug 102 and an inner counterbore diameter of the counterbore 109c of the pressure ferrule 104. For example, in various embodiments, the fit between the outer body diameter of the pressure plug 102 and the inner diameter of the counterbore 109c of the pressure ferrule 104 can be a press fit. Also for example, in accordance with various embodiments, a gap can be maintained between the outer body diameter of the body 121 of the pressure plug 102 and an inner counterbore diameter of the counterbore 109c of the pressure ferrule 104 as appropriate for proper curing of, and sealing by, the binder material 105. In one embodiment, the gap can be between 0.001 and 0.003 inches although one of ordinary skill in the art will appreciate that any gap suitable for sealing may be used that meets application-specific requirements.

According to various embodiments, the pressure ferrule 104 can also include a restriction region 123 including an internal ferrule through-bore 109b of the pressure ferrule 104. The pressure plug 102 can include a neck portion 125 that can be adapted to fit within the restriction region 123 of the pressure ferrule 104. In one embodiment, an outer neck diameter of the neck 125 of the pressure plug 102 can be configured to ensure that there is an appropriate fit between the outer neck diameter of the neck 125 of the pressure plug 102 and an inner ferrule through-bore diameter of the ferrule through-bore 109b of the pressure ferrule 104. For example, the fit between the outside neck diameter of the pressure plug 102 and the inner ferrule through-bore diameter of the ferrule through-bore 109b of the pressure ferrule 104 may be a press fit. Also for example, in accordance with various embodiments, a gap can be maintained between the outside neck diameter of the pressure plug 102 and the inner ferrule through-bore diameter of the ferrule through-bore 109b as appropriate for proper curing of, and sealing by, the binder material. In one embodiment, the gap can be between 0.001 and 0.003 inches although one of ordinary skill in the art will appreciate that any gap suitable for sealing may be used that meets application-specific requirements. Additionally, in one embodiment, the edges 127 of the internal plug through-bore can be chamfered at the longitudinal ends of each pressure plug 102 to facilitate application of a binder material 105 and to prevent damage to optic fibers 107 inserted therethrough.

A bushing 108 can fit within a pressure ferrule 104 to create a seal and to facilitate end polishing of fibers at a first end 100a of a cable 100. In one embodiment, the outer diameter of the bushing 108 can be configured to ensure that there is an appropriate fit between the outer diameter of the bushing 108 and the inner counterbore diameter of the counterbore 109c of the pressure ferrule 104. For example, in various embodiments, the fit between the outer diameter of the bushing 108 and the inner diameter of the counterbore 109c of the pressure ferrule 104 can be a press fit. Also for example, in accordance with various embodiments, a gap can be maintained between the outer diameter of the bushing 108 and an inner counterbore diameter of the counterbore 109c of the pressure ferrule 104 as appropriate for proper curing of, and sealing by, the binder material 105. In one embodiment, the gap can be between 0.001 and 0.003 inches although one of ordinary skill in the art will appreciate that any gap suitable for sealing may be used that meets application-specific requirements. Similar to the pressure plug 102, the edges 129 of the bushing 108 nearest the through-hole 109d can be chamfered to facilitate application of a binder material 105 and to prevent damage to optic fibers 107 inserted therethrough. In accordance with various embodiments, the bushing may have one or more small through-holes 128 that run parallel to the central through-hole. In an exemplary embodiment, a through-hole 128 can have a diameter of a small-gauge syringe needle. When the bushing 108 is in position in the pressure fitting 101, the through-holes 128 can facilitate the application of binder material 105 to the interior of the counterbore 109c of the pressure ferrule 104 and the removal of displaced air upon the application of binder material. In accordance with various embodiments, pins may be placed within the through-holes 129 of the bushing 108 during final construction to seal the through-holes 129.

The components of the pressure fitting 101 may be made of any suitable material. A non-exhaustive list of materials for the pressure ferrule 104 and the pressure plugs 102 can include, for example, metals such as stainless steel, brass, and aluminum; thermoplastics such as polyether ether ketone (PEEK), polyphenylsulfone (PPSU or Radel®), and polyetherimide (PEI or ULTEM®); any other suitable material; and combinations thereof. In accordance with various embodiments, the pressure ferrule 104 may be externally threaded to facilitate connection or mounting with a chamber wall and/or the pressure ferrule 104 may be adapted to be welded or affixed by any other suitable connection or mounting structure. The pressure ferrule 104 may have any suitable exterior shape that satisfies application requirements according to various embodiments including, but not limited to, circular, square, hexagonal, polygonal, ovular, or any other suitable shape. The pressure ferrule 104 may have a substantially smooth outer surface 120 along its length or may have one or more tapers or protrusions in its outer wall. The internal through-bores and counterbores 109a, 109b, 109c of the pressure ferrule 104 and the pressure plugs 102 may be substantially constant along each part's length or may include one or more flared sections or pinch points. In accordance with various embodiments, the pressure ferrule 104 may be adapted to enter a complementary receptacle in a wall of a chamber.

In accordance with various embodiments, a pressure or chemical seal may be advantageously formed by the binder material 105 within the pressure fitting 101 at multiple locations. In an embodiment, a seal may be formed by a bundle of randomized optic fibers 107 that have been coated in a binder material 105 within a through-hole 109 of a pressure fitting 101. An additional seal may be formed by placing binder material 105 between the outer neck diameter of the neck 125 of a pressure plug 102 and the restriction region 123 of the pressure ferrule. A further seal may be formed by placing binder material 105 between the outer body diameter of a body 121 of a pressure plug 102 and the inner counterbore diameter of the counterbore 109c of the pressure ferrule 104. In some embodiments, a binder material 105 may be used to fill and seal empty volume within a counterbore 109c of the pressure ferrule 104. Binder material 105 may also be used to fill and seal in and around the optic fibers 107 as they pass through the through-hole 109d of the bushing 108 at a first end 100a of the cable 100.

In accordance with some embodiments, the use of two pressure plugs 102 can advantageously provide additional sealing when the pressure fitting 101 is used with vacuum or over-pressure environments. If one or more seals near the first end 100a of the cable 100 fail, vacuum or high pressure may be transmitted to the pressure plugs 102. If the pressure plugs 102 experience high pressure, a lateral face 126 of a pressure plug 102 closest to the first end 100a of the cable 100 will be forced against the restriction region 123 of the pressure ferrule 104 thereby improving the seal between the pressure plug 102 and the pressure ferrule 104. If the pressure plugs 102 experience vacuum conditions, a lateral face 126 of a pressure plug 102 furthest from the first end 100a of the cable 100 will be pulled against the restriction region 123 of the pressure ferrule 104 thereby improving the seal between the pressure plug 102 and the pressure ferrule 104.

Figure 3:
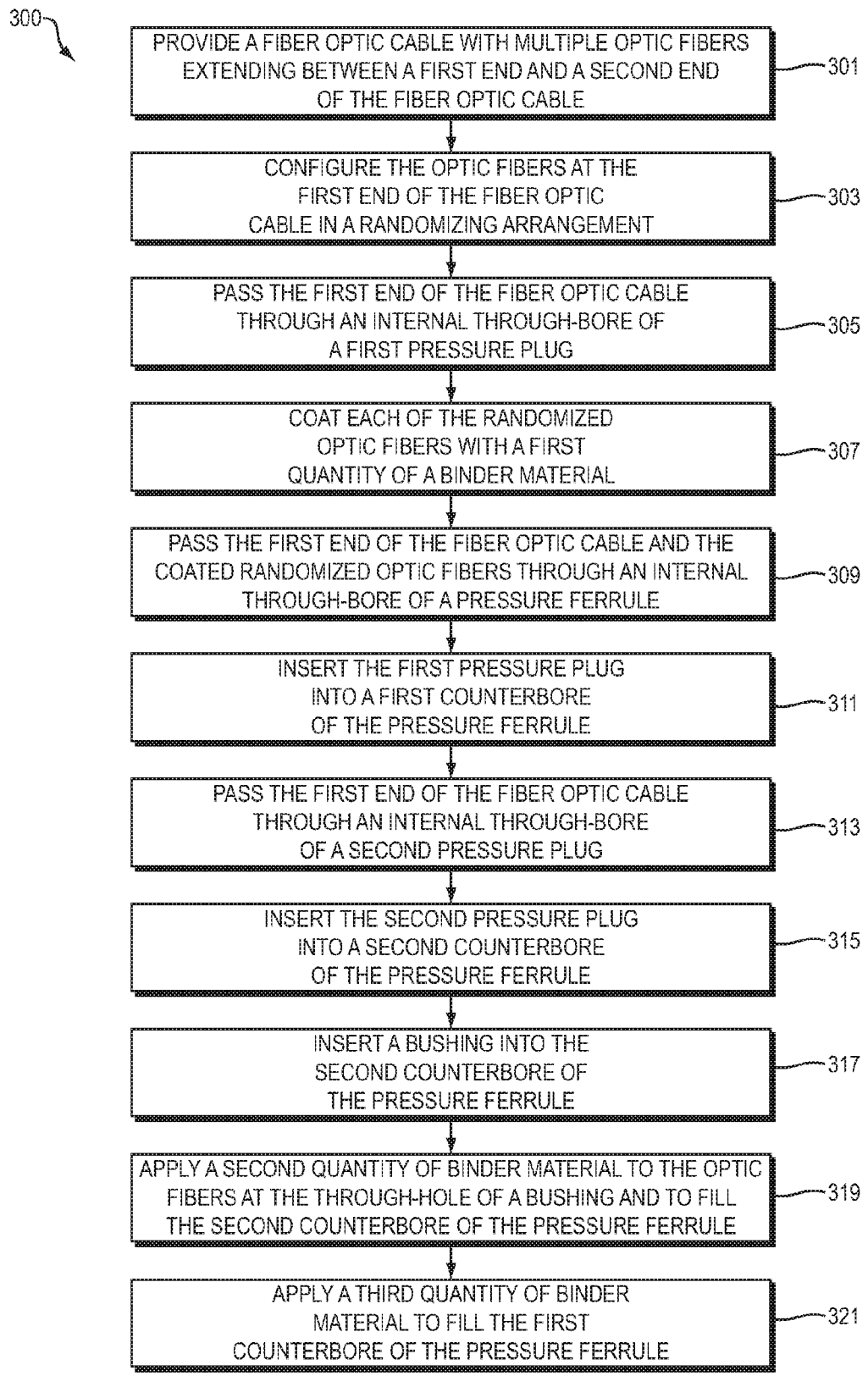
FIG. 3 illustrates an exemplary method to produce a fiber optic cable according to various embodiments.

Referring to FIG. 3, an exemplary method 300 of assembling fiber optic cables in an embodiment of the present invention is presented. The method begins by providing a fiber optic cable with a bundle of multiple optic fibers extending between a first end and a second end of the fiber optic cable (step 301). The step of providing a fiber optic cable may be performed by, for example but is not limited to, providing a bundle of multiple fibers 107 within a cable 100 as described above with reference to FIGS. 1B-D. The provided optic fibers may have additional properties such as coatings, cladding or a gradient index construction as described above with reference to FIGS. 1B-D. In accordance with certain embodiments, the second end 100b of the fiber optic cable 100 may be left bare, unterminated, or terminated with a connector or other appropriate coupling device. The method also configures the exposed fibers at the first end of the cable in a randomizing arrangement (step 303). Configuring the exposed fibers at the first end of the cable in a randomizing arrangement may be performed, for example but is not limited to, using braiding, weaving, or tangling techniques as described above with reference to FIGS. 1B-D.

Continuing to refer to the assembly method of FIG. 3, the first end of the fiber optic cable is passed through an internal through-bore of a first pressure plug (step 305). The passing of the first end of the fiber optic cable through an internal through-bore of a first pressure plug may include, for example but is not limited to, using a mechanical device to draw the cable 100 through an internal through-bore 109a of a first pressure plug 102 as described above with reference to FIGS. 1B-D. The method also coats each of the exposed, randomized optic fibers with a first quantity of a binder material (step 307). Coating each of the exposed, randomized optic fibers with a binder material may include, for example but is not limited to, coating each of the optic fibers 107 with a binder material 105 such as epoxy or adhesive as described above with reference to FIGS. 1B-D. In accordance with certain embodiments, the binder material 105 may provide a pressure or chemical barrier.

The assembly method also passes the first end of the fiber optic cable and the coated randomized optic fibers through an internal through-bore of a pressure ferrule (step 309). The passing of the first end of the fiber optic cable and the coated randomized fibers through an internal through-bore of a pressure ferrule may include, for example but is not limited to, using a mechanical device to draw the coated randomized optic fibers 107 through an internal through-bore 109b of a pressure ferrule 104 as described above with reference to FIGS. 1B-D.

The assembly method also inserts the first pressure plug into a first counterbore of the pressure ferrule (step 311). Inserting the first pressure plug into a first counterbore of the pressure ferrule may include, for example but is not limited to, aligning a pressure plug 102 with the end of the pressure ferrule 104 containing a first counterbore and applying force to maneuver the plug 102 into the first counterbore 109c as described above with reference to FIGS. 1B-D. In accordance with various embodiments, a thin layer of a binder material may be applied to the outer surfaces of the pressure plug before insertion.

The method also passes the first end of the fiber optic cable through an internal through-bore of a second pressure plug (step 313). Passing the first end of the fiber optic cable through an internal through-bore of a second pressure plug may include, for example but is not limited to, using a mechanical device to draw the cable 100 through an internal through-bore 109a of a second pressure plug 102 as described above with reference to FIGS. 1B-D. The method also includes inserting the second pressure plug into a second counterbore of the pressure ferrule (step 315). Inserting the second pressure plug into a second counterbore may include, for example but is not limited to, aligning the pressure plug 102 with an end of a pressure ferrule 104 containing a second counterbore and applying force to maneuver the plug 102 into the second counterbore 109c as described above with reference to FIGS. 1B-D. In accordance with various embodiments, a thin layer of a binder material may be applied to the outer surfaces of the pressure plug before insertion.

The method also inserts a bushing into the second counterbore of the pressure ferrule (step 317). Inserting a bushing into the second counterbore of the pressure ferrule may include, for example but is not limited to, applying force to a bushing 108 to insert it into a counterbore 109c of the pressure ferrule 104 as described above with reference to FIGS. 1B-D. The assembly method also includes applying a second quantity of a binder material to the optic fibers at the through-hole of a bushing and applying the second quantity of a binder material to fill the second counterbore of the pressure ferrule (step 319). Applying a second quantity of a binder material to the optic fibers at the through-hole of a bushing and applying the second quantity of a binder material to fill the second counterbore of the pressure ferrule may include, for example but is not limited to, coating the ends of multiple optic fibers 107 as they extend from the through-hole 109d of a bushing 108 with binder material 105 and injecting binder material 105 into the remaining empty volume in a counterbore 109c of the pressure ferrule 104 as described above with reference to FIGS. 1B-D. In some embodiments, an additional step of curing the first binder material is performed before applying a second binder material. In accordance with various embodiments, the binder material may be filled into the remaining empty volume of the counterbore 109c of the pressure ferrule 104 by inserting the binder material 105 through through-holes 129 of the bushing 108 as described above with reference to FIG. 2D.

The method also includes applying a third quantity of a binder material to fill the first counterbore of the pressure ferrule (step 321). Applying a third quantity of a binder material to fill the first counterbore of the pressure ferrule may include, but is not limited to, adding binder material 105 to the remaining empty volume within a counterbore 109c of the pressure ferrule 104 as described above with reference to FIGS. 1B-D. In accordance with various embodiments, a step of curing the first quantity of a binder material may be performed before applying a third quantity of a binder material. In accordance with various embodiments, a step of curing the second quantity of a binder material may be performed before applying a third quantity of a binder material.

Referring to FIGS. 4A-D, a fiber optic cable 400, in accordance with various embodiments, can include multiple optic fibers 407 extending between a first end 400a and a second, multi-branch end 400b of the cable 400 wherein the optic fibers 407 extend through an internal through-hole 409 of a pressure fitting 401. Portions of the cable 400 extending from the pressure fitting 401 toward the second, multi-branch end 400b can, in accordance with various embodiments, be contained within a cable jacket 403. In accordance with various embodiments, the second, multi-branch end 400b can include two branched portions 403A and 403B. Although FIG. 4A, for clarity, depicts only two branches 403A and 403B in the multi-branch portion, it will be apparent in view of the present disclosure that the second, multi-branch end 400b of the fiber optic cable 400 may include any number of branches in accordance with various embodiments and that the number of branches can vary depending on application-specific requirements. Although FIG. 4A, for clarity, depicts a pressure fitting 401 only at a first end 400a of the cable 400, it will be apparent in view of the present disclosure that pressure fittings 401 may be located at any or all of the ends of the cable 400 including at the ends of any or all multi-branch portions depending on application-specific requirements. In accordance with various embodiments, the pressure fitting 401 can be retained in a fixed position at the first end 400a of the fiber optic cable 400.

Figure 4A:
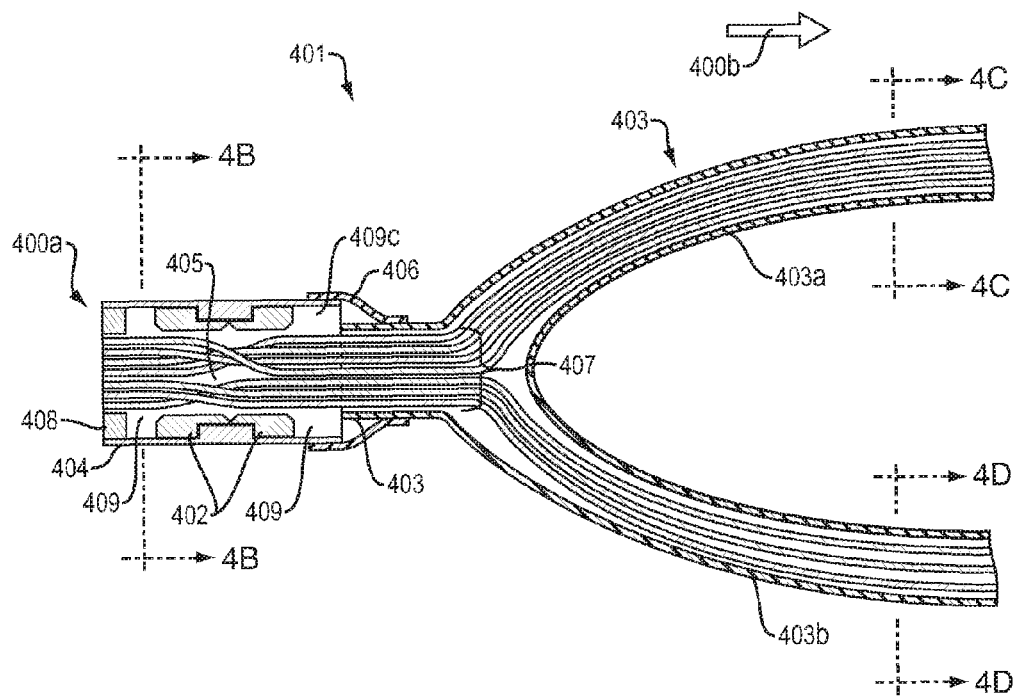
FIG. 4A illustrates a longitudinal cross-sectional view of a fiber optic cable having a bifurcation and showing an exemplary pressure fitting, in accordance with various embodiments.
Figure 4B:
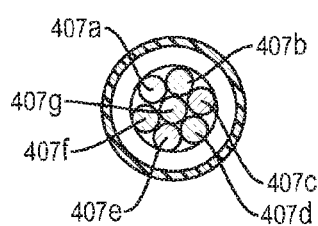
FIGS. 4B, 4C, and 4D illustrate transverse cross sectional views of the fiber optic cable in FIG. 4A taken at lines B-B', C-C', and D-D', respectively.
Figure 4C:
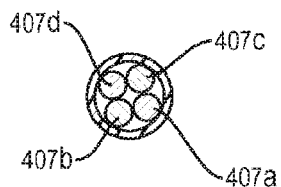
Figure 4D:
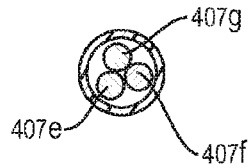

As shown in FIGS. 4A-4D, the relative, cross-sectional, spatial positioning of each of the optic fibers 407 (e.g., B-B', C-C', D-D') of the cable 400, in accordance with various embodiments, can be randomized within the pressure fitting 401. Randomization is shown, for example, in FIGS. 4B-4D, which are transverse cross-sections of the fiber optic cable 400 taken near the first end 400a at B-B' and near the second, multi-branch end 400b at C-C' and D-D'. As shown in FIGS. 4B-4D, the relative spatial positioning of the individual optic fibers 407A-407G within the cable 400 has been mixed in a random manner. Although FIGS. 4A-4D, for clarity, depict only seven optic fibers 407A-G, it will be apparent in view of the present disclosure that any number of optic fibers 407 can be used in accordance with various embodiments and that the number of optic fibers 407 can vary depending upon application-specific requirements. In accordance with various embodiments, portions of the optic fibers 407 can be contained in each of the multi-branch portions of the fiber optic cable 400 and may combine to form a single-branch portion of the cable.

The cable jacket 403 may be made of any suitable material. A non-exhaustive list of cable jacket 403 materials can include, for example, PVC in various forms, fluoropolymer plenum, polyolefin, polyethylene, polyurethane, polybutylene terephthalate, polyamide, LSFH polymer, any other suitable material whether flexible or rigid, and combinations thereof. In accordance with various embodiments, the cable jacket 403 may extend all the way to the ends 400b of each of the multibranch portions 403A, 403B of the cable 400, or the cable 400 at each of the multibranch portions at the second end 400b may be bare, unjacketed, connectorized, or may comprise additional pressure fittings 401 as appropriate for the desired application. In various embodiments, the cable jacket 403 can be stripped back from the first end 400a of the cable 400 to expose the optic fibers 407. In an alternate embodiment, unjacketed optic fibers 407 may be fed through the cable jacket 403. In accordance with various embodiments, an outer cable diameter of the cable 400 including the cable jacket 403 can be greater than, equal to, or less than an inner counterbore diameter of the counterbore 409c of the pressure ferrule 104. To provide an additional seal between the pressure ferrule 404 and the jacket 403, a sealing member 406 may be used in various embodiments. The sealing member 406 may be made of a variety of materials including, but not limited to, heat-shrink tubing, cloth or plastic adhesive tapes, elastomeric materials, and any other suitable material or combination of materials that meets application-specific requirements.

The binder material 405 may create a pressure or chemical barrier in the bundle of optic fibers between the first and second ends of the cable. In accordance with various embodiments, the binder material 405 can include, for example, a heat-cure epoxy such as EPO-TEK® 377 or 353ND (Epoxy Technology Inc.) and/or any other suitable binder material satisfying application-specific pressure and/or chemical resistance properties. In accordance with various embodiments, the binder material 405 can be self-curing, can include multiple interacting components (e.g., a two-part epoxy), or may require an external input to cure including, for example, heat or ultraviolet radiation. In some embodiments, the binder material 105 may be a resin, a thermoset polymer, or a non-epoxy glue or adhesive. In an exemplary embodiment, the outer diameter of each of optic fibers 407 can be completely coated by the binder material 405 within the pressure fitting 401. In a preferred embodiment, the pressure fitting 401 can generate a hermetic seal of at least $1 \times 10^{-8}$ cc/sec @ 1.0 atm.

The optic fibers 407 may include fibers having any properties necessary to meet the needs or requirements of the application. For example, each of the optic fibers 407 may be bare or include cladding or jacketing. In accordance with various embodiments, the optic fibers 407 may include fibers having different diameters, different material properties, or different intended uses. For example, the cable may include a single large-diameter fiber that can transmit light from one or more multibranch portions at a second end 400b to a first end 400a and several small-diameter fibers that can transmit light or signals from a first end 400a to multiple multi-branch portions at the second end 400b. In accordance with various embodiments, the optic fibers 407 may include single-mode or multi-mode fibers, and the fibers may be made of any suitable material including various glasses, plastics, and composite materials. In accordance with various embodiments, the optic fibers 407 can include fibers characterized by a single index of refraction, stepwise radial changes in index of refraction, or a radial gradient index of refraction (GRIN).

Shown in FIG. 4A is an example of location randomization in a cable 400 having a first end 400a and a second, multi-branch end 400b. The randomization is depicted within a through-hole 409 of a pressure fitting 401 as the locations of optic fibers 407 become mixed and interchanged. FIG. 4B represents a cross-section of FIG. 4A at location B-B' and depicts a particular spatial arrangement of optic fibers 407A, 407B, 407C, 407D, 407E, 407F, 407G within a cable jacket 403 at a first end 400a of the fiber optic cable 400. FIG. 4C represents a cross-section of FIG. 4A at location C-C' and depicts a particular spatial arrangement of a portion of the optic fibers 407A, 407B, 407C, 407D in one of the multi-branch portions at the second end 400b of the fiber optic cable 400. FIG. 4D represents a cross-section of FIG. 4A at location D-D' and depicts a particular spatial arrangement of a portion of the optic fibers 407E, 407F, 407G in one of the multi-branch portions at the second end 400b of the fiber optic cable 400. Due to randomization of the optic fibers 407 within the pressure fitting 401, the arrangement of fibers 407A, 407B, 407C, 407D, 407E, 407F, 407G within the cable jacket 403 can be different at the second end 400b than at the first end 400a. This randomization can be accomplished through braiding, weaving, or tangling of the optic fibers 407 within the pressure fitting 401. According to various embodiments, spatial randomization of the optic fibers 407 within the pressure fitting 401 may further include randomized assignment of the fibers to one of the multi-branch portions 403A, 403B at the second end 400b of the fiber optic cable 400. Randomized assignment of the optic fibers 407 to the multi-branch portions 403A, 403B in the fiber optic cable 400 may help to further accomplish the goal of converting an imperfect light source luminance profile to even output illumination from all branches.

In accordance with various embodiments, the first end 400a of the cable 400 may terminate within the pressure fitting 401, may be flush with the end face of the pressure fitting 401, or may extend past the end face of the pressure fitting 401 for integration with a connector or other terminal attachment. In embodiments where the first end 400a of the cable 400 is flush with the end face of the pressure fitting 401, the fiber ends may be polished to produce a flat surface.

When assembled, the components of the pressure fitting 401 can, in accordance with various embodiments, include a pressure ferrule 404 and one or more pressure plugs 402 that, together, define an internal through-hole 409 in accordance with various embodiments and as described above with reference to FIGS. 2A, 2B, and 2C.

In describing exemplary embodiments, specific terminology is used for the sake of clarity. For purposes of description, each specific term is intended to at least include all technical and functional equivalents that operate in a similar manner to accomplish a similar purpose. In this application, the use of the word "fluid" is intended to include both liquids and gases. Additionally, in some instances where a particular exemplary embodiment includes multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A fiber optic cable comprising:
   a plurality of optic fibers extending between a first end of the fiber optic cable and a second end of the fiber optic cable; and
   a pressure fitting defining an internal through-hole, comprising:
      a pressure ferrule,
      a bushing,
      a first pressure plug including a body and an internal plug through-bore through which the plurality of optic fibers extend, and
      a second pressure plug including a body and an internal plug through-bore through which the plurality of optic fibers extend, wherein the first pressure plug is disposed within the pressure ferrule on a first side of the pressure fitting, and the bushing and the second pressure plug are disposed within the pressure ferrule on a second side of the pressure fitting,
   wherein a portion of each of the plurality of optic fibers at the first end of the fiber optic cable extends through the internal through-hole of the pressure fitting and the pressure fitting is retained at the first end of the fiber optic cable, the pressure fitting creating at least one of a pressure or chemical barrier at the first end of the fiber optic cable that prevents migration of fluids into or out of the cable,
   wherein the plurality of optic fibers are configured in a randomizing arrangement within the internal through-hole of the pressure fitting to randomize the relative spatial positions of the individual optic fibers among the plurality of optic fibers between the first end of the cable and the second end of the cable.

2. The fiber optic cable of claim 1, wherein at least a portion of the plurality of optic fibers are contained within a cable jacket.

3. The fiber optic cable of claim 1, wherein the plurality of optic fibers are configured in the randomizing arrangement within the through-hole of the pressure fitting by at least one of braiding, weaving, or tangling.

4. The fiber optic cable of claim 1, wherein the through-hole of the pressure fitting is filled with a binder material for retaining the pressure fitting at the first end of the fiber optic cable for creating at least one of a pressure or chemical barrier.

5. The fiber optic cable of claim 4, wherein an entirety of an outer diameter of each of the plurality of optic fibers configured in the randomizing arrangement within the internal through-hole of the pressure fitting is coated by the binder material.

6. The fiber optic cable of claim 4, wherein the pressure ferrule, the first pressure plug, the second pressure plug, and the binder material are pressure and chemical resistant.

7. The fiber optic cable of claim 4, wherein the binder material is an epoxy or an adhesive.

8. The fiber optic cable of claim 1, wherein the second end of the fiber optic cable includes one or more bifurcations such that each bifurcated section contains a portion of the plurality of optic fibers.

9. The fiber optic cable of claim 1, wherein the ends of the portions of each of the plurality of optic fibers are flush with an end face of the bushing.

10. A method of producing a fiber optic cable comprising:
    providing a fiber optic cable that includes a plurality of optic fibers extending between a first end and a second end of the fiber optic cable;
    configuring the plurality of optic fibers at the first end of the fiber optic cable in a randomizing arrangement;
    passing the first end of the fiber optic cable through an internal plug through-bore of a first pressure plug;
    coating each of the randomized plurality of optic fibers with a first quantity of a binder material;
    passing the first end of the fiber optic cable and the coated randomized optic fibers through an internal through-bore of a pressure ferrule;
    inserting the first pressure plug into a first counterbore of the pressure ferrule;
    passing the first end of the fiber optic cable through an internal plug through-bore of a second pressure plug;
    inserting the second pressure plug into a second counterbore of the pressure ferrule;
    inserting a bushing into the second counterbore of the pressure ferrule; and
    applying a second quantity of a binder material to the plurality of optic fibers at a through-hole of the bushing and applying the second quantity of the binder material to fill the second counterbore of the pressure ferrule,
    wherein the randomizing arrangement randomizes relative spatial positions of individual optic fibers among the plurality of optic fibers between the first end of the cable and the second end of the cable.

11. The method of claim 10, wherein at least a portion of the plurality of optic fibers is contained within a cable jacket.

12. The method of claim 11, further comprising applying a sealing member around an abutment of an end of the pressure ferrule and a terminal end of the cable jacket.

13. The method of claim 10, wherein the second end of the fiber optic cable includes one or more bifurcations such that each bifurcated section contains a portion of the plurality of optic fibers.

14. The method of claim 10, wherein configuring the plurality of optic fibers at the pressure fitting in a randomizing arrangement includes at least one of braiding, weaving, or tangling the plurality of optic fibers.

15. The method of claim 10, wherein an entirety of an outer diameter of each of the plurality of optic fibers configured in the randomizing arrangement is coated by the binder material.

16. The method of claim 10, wherein the pressure ferrule, the first pressure plug, the second pressure plug, and the binder material are pressure and chemical resistant.

17. The method of claim 10, wherein the binder material is an epoxy or an adhesive.

18. The method of claim 10, further comprising applying a third quantity of a binder material to fill the first counterbore of the pressure ferrule.

19. The method of claim 18, further comprising curing the first quantity of a binder material before applying the third quantity of a binder material to fill the first counterbore of the pressure ferrule.

20. The method of claim 18, further comprising curing the second quantity of a binder material before applying the third quantity of a binder material to fill the first counterbore of the pressure ferrule.

21. The method of claim 10, further comprising curing the first quantity of a binder material before applying the second quantity of a binder material to the plurality of optic fibers at a through-hole of the bushing and applying the second quantity of the binder material to fill the second counterbore of the pressure ferrule.

* * * * *